United States Patent
Boland et al.

(10) Patent No.: US 9,989,185 B2
(45) Date of Patent: Jun. 5, 2018

(54) SOCKET TOOL FOR SERVICING FLUID CONNECTORS

(71) Applicants: Stuart J. Boland, Denver, CO (US); Dilan Nirushan Fernando, Thornton, CO (US); Sean K. Fitzsimons, Thornton, CO (US)

(72) Inventors: Stuart J. Boland, Denver, CO (US); Dilan Nirushan Fernando, Thornton, CO (US); Sean K. Fitzsimons, Thornton, CO (US)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 14/612,128

(22) Filed: Feb. 2, 2015

(65) Prior Publication Data
US 2016/0221160 A1 Aug. 4, 2016

(51) Int. Cl.
*F16L 55/18* (2006.01)
*B25B 13/06* (2006.01)
*B25B 27/24* (2006.01)

(52) U.S. Cl.
CPC ............ *F16L 55/18* (2013.01); *B25B 13/06* (2013.01); *B25B 27/24* (2013.01)

(58) Field of Classification Search
CPC ................................. B25B 13/06; B25B 27/24
USPC .......... 137/543, 121, 181, 123, 124; 81/121, 81/121.1; D23/209, 207, 259–265
See application file for complete search history.

(56) References Cited

U.S. PATENT DOCUMENTS

| | | | |
|---|---|---|---|
| 4,507,837 A * | 4/1985 | Hinkle | B25B 27/023 29/262 |
| 5,293,902 A * | 3/1994 | Lapierie | B60H 1/00585 137/614.04 |
| 6,050,295 A * | 4/2000 | Meisinger | F16K 15/063 137/541 |
| 6,386,596 B1 * | 5/2002 | Olson | F16L 37/0925 285/305 |
| 7,174,910 B2 * | 2/2007 | Kayukawa | F16K 15/20 137/234.5 |
| 7,390,033 B2 * | 6/2008 | Weick | F16L 19/04 285/334.2 |
| 7,427,170 B2 | 9/2008 | Van Buskirk et al. | |
| 8,622,509 B2 | 1/2014 | Olson | |
| 8,628,169 B2 | 1/2014 | Steuer et al. | |

(Continued)

FOREIGN PATENT DOCUMENTS

| | | |
|---|---|---|
| JP | 01159077 A | 6/1989 |
| JP | 06106727 | 4/1994 |
| JP | 2004114556 A | 4/2004 |

*Primary Examiner* — Monica Carter
*Assistant Examiner* — Katina Henson
(74) *Attorney, Agent, or Firm* — Duft Bornsen & Fettig LLP

(57) ABSTRACT

Socket tool for servicing fluid connectors. In one embodiment, a tool includes a body having a hollow recess at one end. The hollow recess has non-circular dimensions for rotating a head fitting of the fluid connector about an axis. The tool further includes a pin that mounts to a surface inside the hollow recess so that the pin is disposed in an axial direction along a center of the axis. The pin enters an aligned opening of a nozzle of the fluid connector and occupies a conduit space in the nozzle when the hollow recess is engaged with the head fitting of the fluid connector.

17 Claims, 5 Drawing Sheets

(56) References Cited

U.S. PATENT DOCUMENTS

| | | | |
|---|---|---|---|
| 8,844,979 B2 * | 9/2014 | Danielson | F16L 37/1215 |
| | | | 137/798 |
| 9,297,469 B2 * | 3/2016 | Bell | B25B 13/50 |
| 2010/0307434 A1 * | 12/2010 | Odell | F01L 1/185 |
| | | | 123/90.15 |

* cited by examiner

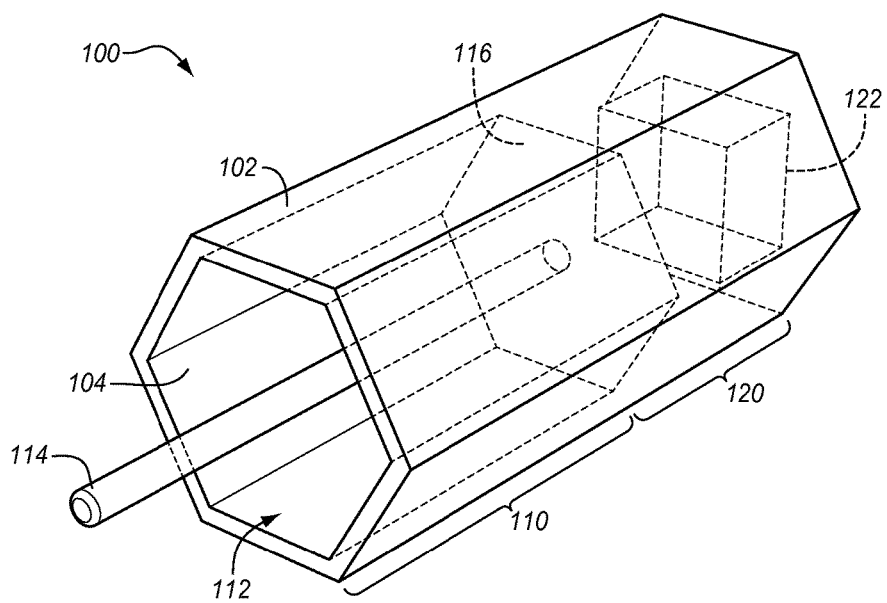
FIG. 1
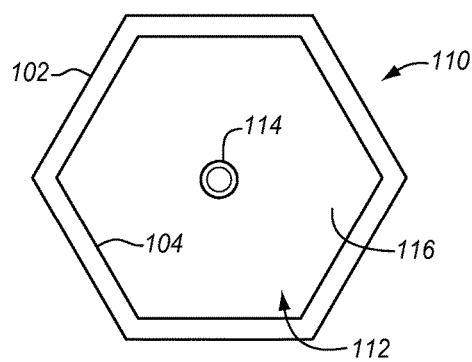 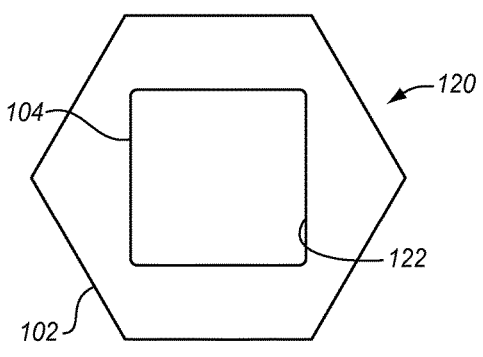
FIG. 2 FIG. 3

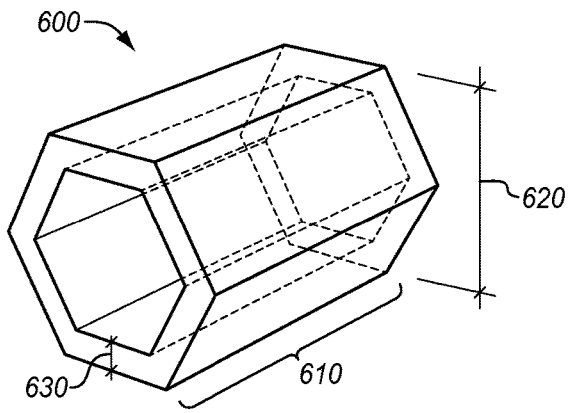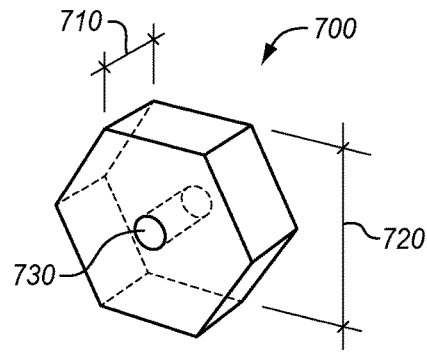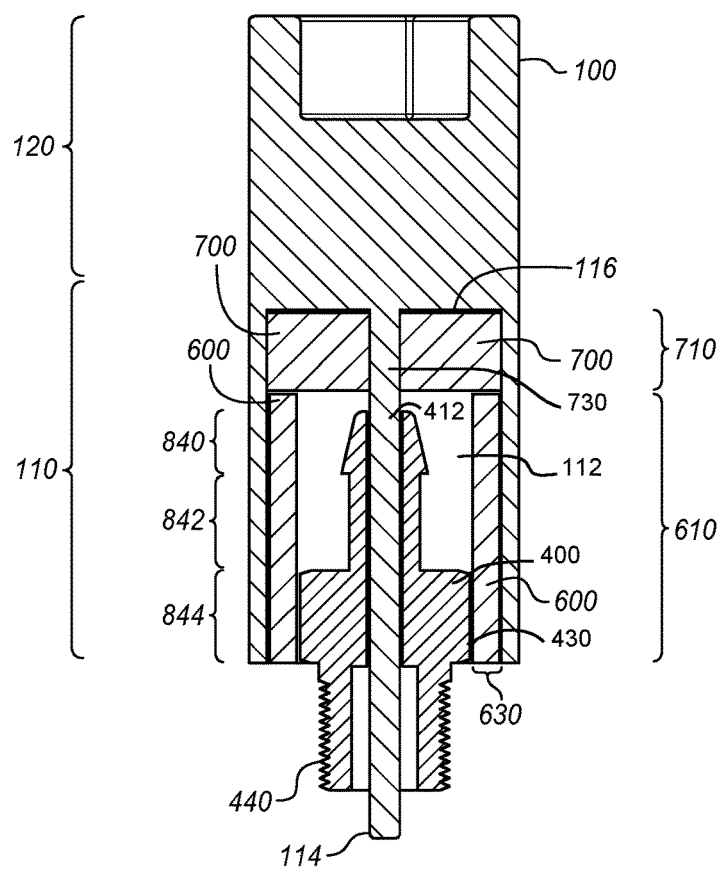
FIG. 6   FIG. 7
FIG. 8

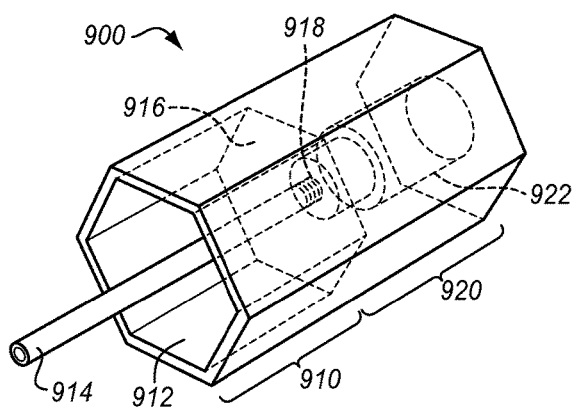
FIG. 9
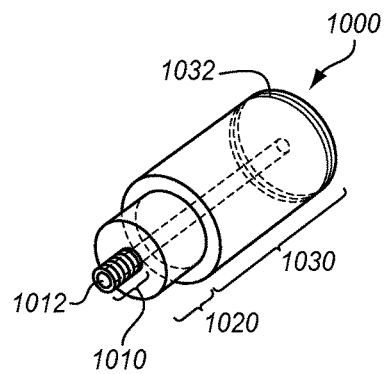
FIG. 10
FIG. 11
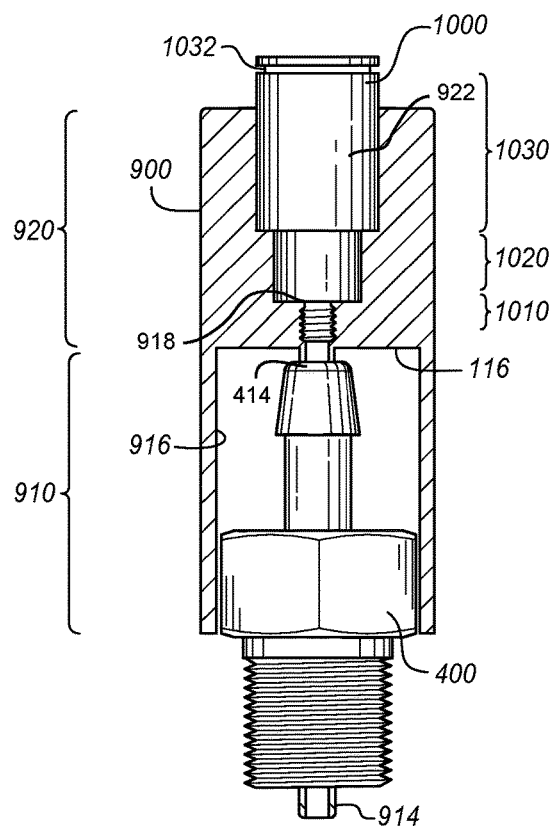

SOCKET TOOL FOR SERVICING FLUID CONNECTORS

FIELD OF THE INVENTION

The invention relates to a socket tool, and in particular, a socket tool adapted to facilitate installation of fluid connectors.

BACKGROUND

Fluid handling systems often use flexible tubes to transport fluid between system components. Each tube attaches to a fluid connector that is mounted on a system component. The fluid connector secures an open end of the tube to allow fluid flow from the tube into the system component via a conduit within the fluid connector.

When a fluid connector breaks or becomes defective it may be replaced by installing a new fluid connector into the system component. The new fluid connector may be coated with a sealant and fastened to the system component. An insufficient amount of sealant may cause fluid leaks, while an excessive amount of sealant may restrict or block fluid flow. These defects are typically not discovered until the system is back online and operational for a period of time.

A defective installation of a fluid connector may prove costly since it can necessitate multiple installation procedures each with a period of system downtime. System downtime may be made even longer if the fluid connectors are attached to a system component which is difficult to reach or remove for maintenance. It is therefore desirable to improve the manual installation of fluid connectors to reduce installation time and minimize defective installations.

SUMMARY

Embodiments described herein relate a tool for servicing fluid connectors. In one embodiment, a tool includes a body having a hollow recess at one end. The hollow recess has non-circular dimensions for rotating a head fitting of the fluid connector about an axis. The tool also includes a pin that mounts to a surface inside the hollow recess so that the pin is disposed in an axial direction along a center of the axis. The pin enters an aligned opening of a nozzle of the fluid connector and occupies a conduit space in the nozzle when the hollow recess is engaged with the head fitting of the fluid connector.

The features, functions, and advantages that have been discussed can be achieved independently in various embodiments or may be combined in yet other embodiments, further details of which can be seen with reference to the following description and drawings.

DESCRIPTION OF THE DRAWINGS

Figure 4:
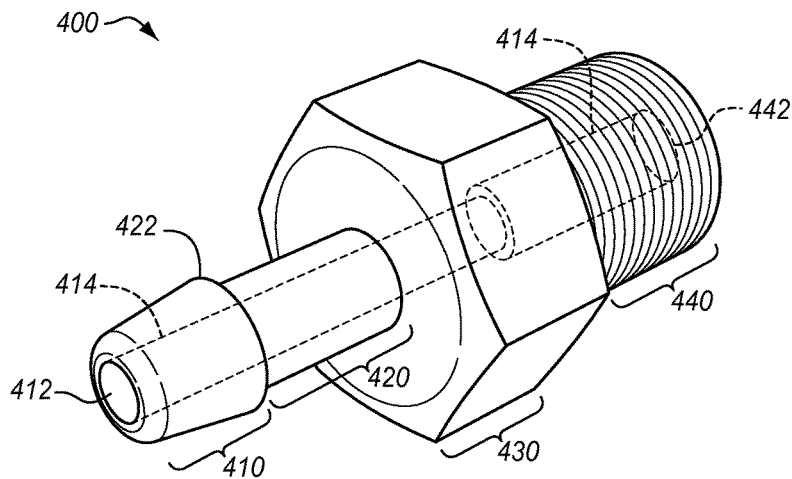

Having thus described examples of the disclosure in general terms, reference will now be made to the accompanying drawings, which are not necessarily drawn to scale, and wherein like reference characters designate the same or similar parts throughout the several views.

FIG. 1 is a perspective view of a socket tool in an exemplary embodiment.

FIG. 2 is a cross-sectional view of a socket portion of a socket tool in an exemplary embodiment.

FIG. 3 is a cross-sectional view of a driver portion of a socket tool in an exemplary embodiment.

FIG. 4 is a perspective view of a fluid connector in an exemplary embodiment.

Figure 5:
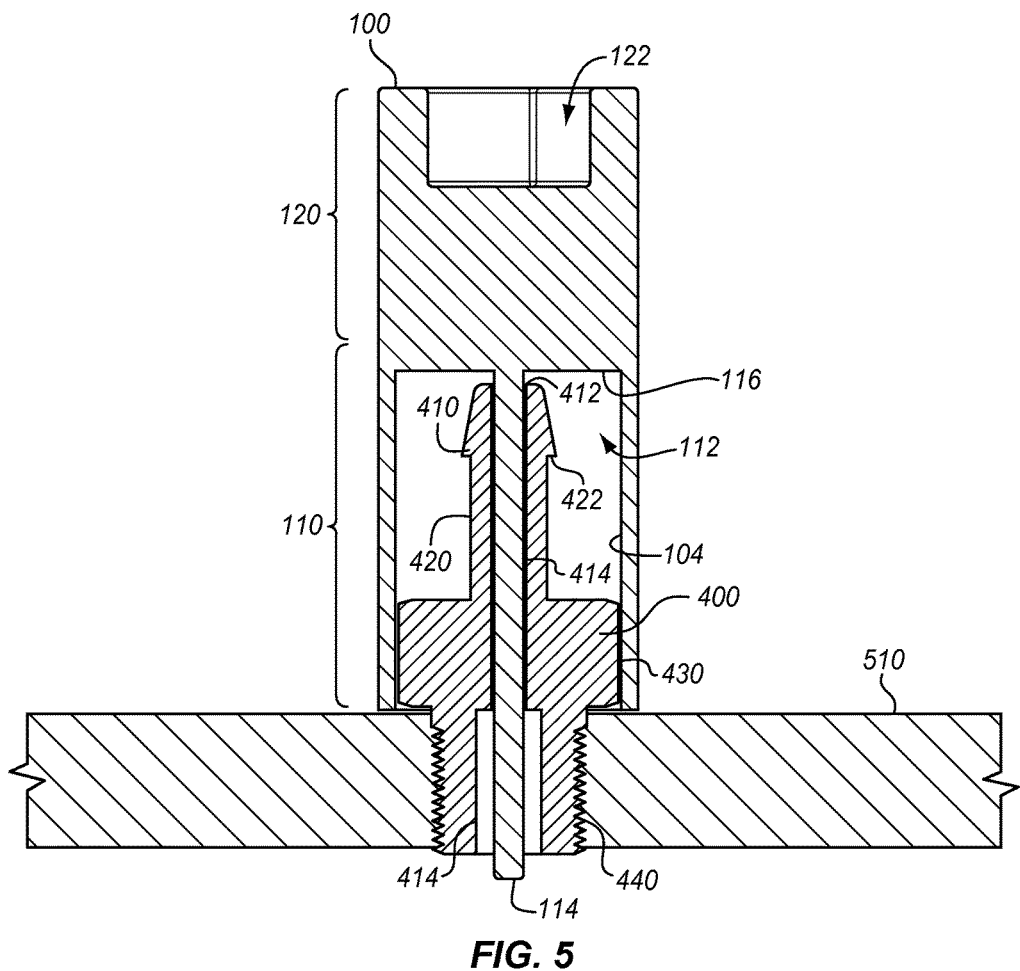

FIG. 5 is a cross-sectional view of a socket tool engaged with a fluid connector in an exemplary embodiment.

FIG. 6 is a perspective view of a sidewall spacer in an exemplary embodiment.

FIG. 7 is a perspective view of a lengthwise spacer in an exemplary embodiment.

FIG. 8 is a cross-sectional view of a socket tool engaged with a fluid connector with a sidewall spacer and a lengthwise spacer in an exemplary embodiment.

FIG. 9 is a perspective view of a socket tool in another exemplary embodiment.

FIG. 10 is a perspective view of a maintenance connector in an exemplary embodiment.

FIG. 11 a cross-sectional view of a socket tool engaged with a fluid connector and with a maintenance connector in an exemplary embodiment.

Figure 12:
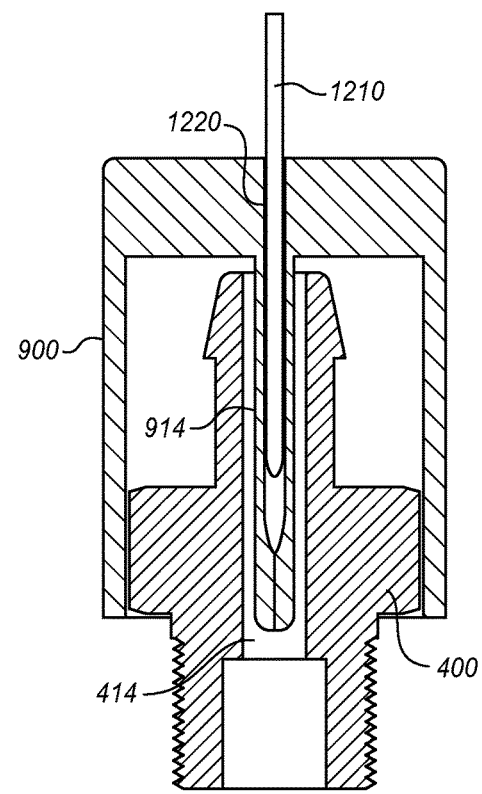

FIG. 12 is a cross-sectional view of a socket tool with a hollow expandable pin in a refracted position.

Figure 13:
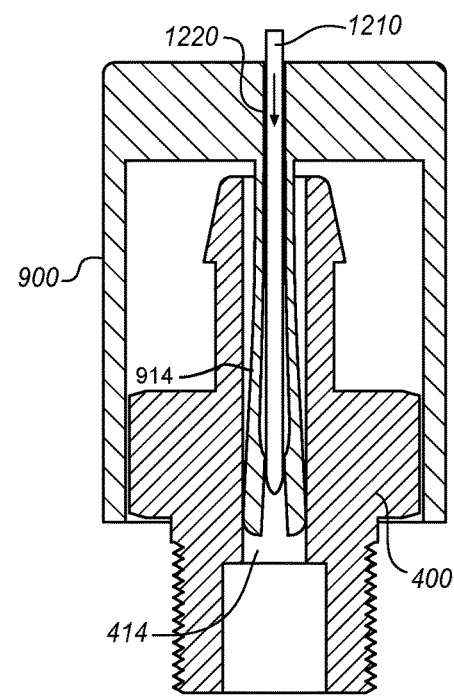

FIG. 13 is a cross-sectional view of a socket tool with a hollow expandable pin in an expanded position.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

FIG. 1 is a perspective view of a socket tool 100 in an exemplary embodiment. Socket tool 100 generally includes an outer surface 102 and an inner surface 104. The exterior walls of outer surface 102 form a hexagonal shape that extends in a lengthwise direction of socket tool 100 through a socket portion 110 and a driver portion 120. An interior wall 116 is disposed in a direction substantially perpendicular to the lengthwise direction at a boundary between socket portion 110 and driver portion 120. Socket portion 110 includes a hollow recess 112 and a pin 114 mounted to interior wall 116. Driver portion 120 includes a driver space 122.

It will be appreciated that surfaces of socket tool 100 may form non-circular shapes other than that shown and described herein by matter of design choice. For instance, inner surface 104 of socket portion 110 may form a shape other than hex such as square, spline, double hex, etc. and inner surface 104 of driver space 122 may form a shape other than square such as cross, phillips, hex, etc. Outer surface 102 may also comprise a shape other than hex. Additionally, pin 114 may form alternative, non-circular shapes and may be fixed or detachably coupled to interior wall 116.

FIG. 2 is a cross-sectional view of a socket portion 110 of socket tool 100 in an exemplary embodiment. In socket portion 110, the interior walls of inner surface 104 form a hexagonal shape with smaller dimensions than the hexagon shape of outer surface 102. Pin 114 has a circular cross-section and is axially centered in recess 112. Pin 114 protrudes perpendicularly from interior wall 116 in a lengthwise direction, also referred to herein as an axial direction.

FIG. 3 is a cross-sectional view of driver portion 120 of socket tool 100 in an exemplary embodiment. In driver portion 120, the interior walls of inner surface 104 form a square shape. The hollow space of driver space 122 is adapted to receive a male driver with corresponding dimensions. For instance, driver space 122 may receive a square member of a hand-held ratchet wrench.

Referring generally to FIGS. 1-3, a rotation action of a driver in driver space 122 rotates socket tool 100 circumferentially about its axis. The torque of socket tool 100 rotates a fitting engaged with recess 112 of socket portion 110. The threaded shank of the fitting may thus be rotatably advanced into a corresponding fastener. One example of a fitting is a fluid connector. Exemplary embodiments a fluid connector are discussed in greater detail below.

FIG. 4 is a perspective view of a fluid connector 400 in an exemplary embodiment. Fluid connector 400 includes a nozzle portion 410, a neck portion 420, a fitting portion 430, and a threaded portion 440. A conduit 414 extends in the axial direction of a length of fluid connector 400 from a nozzle opening 412 of nozzle portion to a terminal 442 of threaded portion 440.

Nozzle portion 410 is adapted to be inserted into an inner channel of a conduit, such as a hose or flexible tube. The outer surface of nozzle portion 410 may be angled to provide easier insertion of nozzle portion 410 into an open end of a flexible tube. Neck portion 420 includes one or multiple circumferentially disposed barbs 422. Each barb 422 generally forms an outer surface that extends from a first smaller diameter to a second larger diameter to provide engagement with a hose or conduit which is forced over at least one barb 422 to couple with fluid connector 400. Fitting portion 430, sometimes referred to as a head or head fitting portion, includes wrench flats in a hexagonal or other suitable shape on the outer surface. The wrench flats are adapted to be engaged with a suitable tool for rotation of fluid connector 400 such that threaded portion 440 is rotatably fastened into a corresponding surface.

During system operation, fluid connector 400 facilitates fluid transportation from a hose into the system component to which it is fastened or installed. At some point, a fluid connector may break or become defective due to the force of attaching/detaching a hose or other forces in the system environment. The system is typically shutoff while the defective fluid connector is unfastened from the surface of the system component and a new fluid connector is installed in its place. Prior to fastening threaded portion 440 into the surface of the system component, a sealant, such as a silicone sealant, may be applied to the surfaces of fluid connector 400 to minimize leaks during operational use. In previous solutions, there is no way to ensure that the applied sealant will not form in conduit 414 during installation of fluid connector 400.

FIG. 5 is a cross-sectional view of socket tool 100 engaged with fluid connector 400 in an exemplary embodiment. Fluid connector 400 is shown in an installed position into the surface of a system component 510. When fluid connector 400 is installed, threaded portion 440 of fluid connector 400 is advanced into an opening or threaded housing in the surface of system component 510 and a bottom of fitting portion 430 contacts or is substantially flush with an outer surface of system component 510. Examples of a system component include, but is not limited to, a manifold, valve, pump, etc.

In FIG. 5, socket tool 100 is shown in an engaged position with fluid connector 400. When engaged, at least a portion of inner surface 104 in hollow recess 112 of socket tool 100 overlaps in the axial direction with a corresponding shape of the outer surface of fitting portion 430 of fluid connector 400. A rotation action of socket tool 100 (e.g., by rotation of male driver in driver space 122) transfers rotational force to fluid connector 400 for installation or removal of fluid connector 400 to or from the surface of system component 510.

In the process of moving socket tool 100 and/or fluid connector 400 towards an engaged position, pin 114 and conduit 414 are aligned at a common axis and an end of pin 114 enters nozzle opening 412 and advances down a length of conduit 414. Pin 114 substantially occupies a space of at least some length of conduit 414 when socket tool 100 and fluid connector 400 are in the engaged position for installation. As shown in FIG. 5, the shape of conduit 414 is uniform in the axial direction in nozzle portion 410, neck portion 420, and fitting portion 430 and widened in threaded portion 440. As such, when socket tool 100 and fluid connector 400 are in the engaged position, pin 114 substantially occupies conduit 414 space in nozzle portion 410, neck portion 420, fitting portion 430 to prevent any sealant applied to fluid connector 400 from forming and drying in those areas of conduit 414.

It will be appreciated, however, that sizes, shapes, and dimensions of pin 114 and conduit 414 may vary by matter of design choice and that number configurations are possible. For instance, the length of pin 414 may be configured so that a tip of pin 414 is able to enter through some or all portions 410-440 of fluid connector 400 when in the socket tool 100 and fluid connector 400 are in the engaged position. As such, pin 414 may be configured to extend beyond recess 112 at one end when its other end is mounted to interior wall 116. Alternatively or additionally, the shape or dimension of pin 414 may be configured to substantially occupy the space of some or all portions 410-440 of conduit 414 when in the socket tool 100 and fluid connector 400 are in the engaged position.

Socket tool 100 and fluid connector 400 may generally have corresponding shapes and dimensions for proper engagement and installation. As shown in FIG. 5, in a direction perpendicular to the axial direction, the width of recess 112 in socket tool 100 between opposite ends of the shape (e.g., opposite hexagonal sides) is slightly larger than the width between opposite ends of the shape in fitting portion 430 (e.g., opposite wrench flats in a hexagonal shape) of fluid connector 400 to transfer torque without slippage. Similarly, the length of recess 112 in the axial direction is equal to or larger than the summed axial length of the fitting portion 430, neck portion 420, and nozzle portion 410 to allow at least the edge of recess 112 to engage with a top of fitting portion 430, but is not so long that a length of recess 112 covers threaded portion 440 when fluid connector 400 is pressed into recess 112.

In some circumstances, the width of recess 112 of socket tool 100 may be too large to properly engage a width of fitting portion 430 of fluid connector 400 for rotating without slippage. Additionally, a length of recess 112 in the axial direction may be too long relative to the nozzle components of fluid connector 400. In other words, recess 122 may overlap with threaded portion 440 in the axial direction when fitting portion 430 is seated in recess 112, making it more difficult to properly align and advance fitting portion 430 into a threaded opening of system component 510. Proper installation is particularly difficult in this situation when fluid connector 400 is being installed in a system component housing that is difficult to reach or see by the installer. To properly engage fluid connector 400 in these circumstances, socket tool 100 may accommodate spacers within its recess 112 as described in more detail below.

FIG. 6 is a perspective view of a sidewall spacer 600 in an exemplary embodiment. Sidewall spacer 600 generally forms a hollow shape with an outer surface that corresponds with a shape and dimensions of recess 112 of socket tool 100 and an inner surface that corresponds with the shape and dimension of an outer surface of fitting portion 430 of fluid connector 400. Sidewall spacer 600 has a length 610 in the axial direction, a width 620 perpendicular to the axial direction, and a thickness 630 between the outer surface and the inner surface of the hollow shape.

FIG. 7 is a perspective view of a lengthwise spacer 700 in an exemplary embodiment. Lengthwise spacer 700 generally forms a solid shape with a thickness 710 in the axial direction and a hollow channel 730 centered in the axial direction. Lengthwise spacer 700 has a width 720 perpendicular to the axial direction and a shape and dimensions that correspond with recess 112 of socket tool 100.

FIG. 13 is a cross-sectional view of socket tool 900 with a hollow expandable pin in an expanded position. In the expanded position, interior pin 1210 is pressed in the axial direction to cause a tip of pin 914 to expand a direction perpendicular to the axial direction within conduit 414 of fluid connector 400. As shown in FIG. 13, tip of pin 914 (e.g., opposite the mounted end) includes a slit with a smaller inner diameter or shape than that of the outer diameter or shape of interior pin 1210. Thus, when interior pin 1210 is pressed in the axial direction in to the slit in pin 914, pin 914 expands and the outer surface of pin 914 contacts the walls of conduit 414 of fluid connector 400. The expansion/contact stabilizes fluid connector 400 during rotation with socket tool 900 for improved rotational stability. The rotational stability may be particularly useful for installing fluid connector 400 in an area which is difficult to see or reach for the installer. After installation is complete, interior pin 1210 may be depressed or retracted in the reverse direction into hollow space 1220 back into a retracted position to disengage socket tool 900 with fluid connector 400.

Similarly, thickness 710 of lengthwise spacer 700 enables socket tool 100 to engage fittings of various nozzle lengths. Lengthwise spacer 700 is adapted to slide over pin 114 or enable pin 114 to couple to interior wall 116 via hollow channel 730. FIG. 8 shows lengthwise spacer 700 seated into a position at the bottom of recess 112 to effectively resize the axial length of recess 112.

Lengthwise spacer 700 may be selected for a thickness 710 such that length of fluid connector 400 components to be disposed above an installed surface substantially match the length of recess 112 when nozzle opening 412 is close to or flush with lengthwise spacer 700 (e.g., fluid connector 400 is seated or engaged with recess 112 of socket tool 100). That is, if fluid connector 400 has a relatively shorter length of portions to be exposed above an installed surface (e.g., the sum of nozzle portion axial length 840, neck portion axial length 842, and fitting portion axial length 844), the addition of lengthwise spacer 700 to recess 112 improves stabilization of pin 114 mounted to interior wall 116 with hollow channel 730 and also ensures that the body of socket tool 110 does not overlap with threaded portion of 440 during installation.

It will be appreciated that the spacer configuration shown in FIG. 8 is exemplary and that alternative shapes, sizes, positions, and combinations may be used. For instance, sidewall spacer 600 and lengthwise spacer 700 may have non-circular shapes other than hexagonal to correspond with other non-circular shapes of socket tool 100 and/or fluid connector 400.

In one embodiment, spacers are used in driver space 122 to accommodate various shapes, sizes, and types of driving members. In another embodiment, a driver sleeve engages at least an end portion of external surface 104 of driver portion 120 of socket tool 100. The driver sleeve may have its own driver space that is different than driver space 122 of socket tool 100 to accommodate a different type of driver member. It will be appreciated that various configurations, shapes, and combinations are possible and that a driver sleeve or multiple driver sleeves may be used in addition to or instead of a driver space 122 in socket 100. Thus, in one embodiment, socket tool 100 does not include driver space 122 and is rotated either manually or with a suitable driving sleeve. Alternative configurations of a driver space of a socket tool are discussed in greater detail below.

It may also be desirable for socket tool 100 to facilitate various maintenance procedures. FIG. 9 is a perspective view of a socket tool 900 in another exemplary embodiment. Socket tool 900 is similar to socket tool 100 already described and therefore a detailed description of each element is omitted for the sake of brevity. In FIG. 9, pin 914 is hollow along its central axis and interior wall 916 includes a hole 918 that corresponds and substantially aligns with pin 114 in the axial direction. Additionally, driver space 922 is adapted to receive a maintenance connector to facilitate further servicing features of fluid connector 400.

FIG. 10 is a perspective view of a maintenance connector 1000 in an exemplary embodiment. Maintenance connector 1000 includes a front portion 1010, a middle portion 1020, and an end portion 1030 and a hollow conduit that extends from an opening 1012 in front portion 1010 to an opening in end portion 1030. Front portion 1020 includes a threaded outer surface to fasten to a corresponding space and threaded housing in driver space 922. Thus, driver space 922 accommodates the shape and external threaded surface of maintenance connector 1000. It will be appreciated that the particular shape and configuration of driver space 922 and maintenance connector 1000 shown is exemplary and that other shapes and/or coupling mechanisms may be used by matter of design choice.

Maintenance connector 1000 facilitates adaptation to various maintenance systems, such as a gage, pump, vacuum or other type of fluid circulation device. As such, a ridge connect 1032 of maintenance connector 1000 is configured to couple with a coupling component of a maintenance tool, such as a flexible tube, hose, or other type of conduit to a maintenance device. Additionally, the hollow conduit in maintenance connector 1000 may align with hole 918 in interior wall 916 (and therefore also align with pin 918 and its hollow space) in the axial direction when maintenance connector 1000 is properly positioned in driver space 922.

FIG. 11 is a cross-sectional view of socket tool 900 engaged with fluid connector 400 and with maintenance connector 1000 in an exemplary embodiment. A hollow central axis extends through socket tool 100 (e.g., inside hollow conduit in pin 914 and through hole 918 in interior wall 916) as well as through maintenance connector 1000 (e.g., hollow conduit between openings) when maintenance connector 1000 is properly positioned in driver space 922. This hollow central axis allows components and/or fluid (e.g., air, water, probes etc.) from the maintenance system to be applied to conduit 414 for maintenance procedures.

Ridge connect 1032 of maintenance connector 1000 is disposed outside driver space 922 when maintenance connector 1000 is seated/fastened in driver space 922 to allow coupling with, for example, a hose of the maintenance system. Fluid may be applied from the maintenance component to conduit 414 via the hollow central axis of socket tool 100 and maintenance connector 1000 to remove buildup in conduit 414 of fluid connector 400. Alternatively or additionally, maintenance connector 1000 may facilitate flushing or removal of fluid within system component 510. It will be appreciated that a number of maintenance procedures are possible and that such maintenance procedures may be performed as part of installation or as a separate procedure.

Hollow space inside pin 114 may also enable other features for improved installation. FIG. 12 is a cross-sectional view of socket tool 900 with a hollow expandable pin in a refracted position. A hollow space 1220 of pin 414 is configured to receive an interior pin 1210. Interior pin 1210 is configured to slide back and forth in the axial direction of the hollow space 1220 in response to user input. For example, one end of interior pin 1210 may be disposed through hole 918 in interior wall 916 or otherwise accessible to manual manipulation in driver space 922 or even outside driver space 922 (e.g., via mechanical button coupled to interior pin 1210). When interior pin 1210 is in a resting position or not depressed in the axial direction it remains seated in hollow space 1220 without causing expansion of pin 914.

FIG. 13 is a cross-sectional view of socket tool 900 with a hollow expandable pin in an expanded position. In the expanded position, interior pin 1210 is pressed in the axial direction to cause a tip of pin 914 to expand a direction perpendicular to the axial direction within conduit 414 of fluid connector 400. As shown in FIG. 13, tip of pin 114 (e.g., opposite the mounted end) includes a slit with a smaller inner diameter or shape than that of the outer diameter or shape of interior pin 1210. Thus, when interior pin 1210 is pressed in the axial direction in to the slit in pin 914, pin 914 expands and the outer surface of pin 914 contacts the walls of conduit 414 of fluid connector 400. The expansion/contact stabilizes fluid connector 400 during rotation with socket tool 900 for improved rotational stability. The rotational stability may be particularly useful for installing fluid connector 400 in an area which is difficult to see or reach for the installer. After installation is complete, interior pin 1210 may be depressed or retracted in the reverse direction into hollow space 1220 back into a retracted position to disengage socket tool 900 with fluid connector 400.

It will be appreciated that shapes, sizes, dimensions, and designs of components discussed with respect to FIGS. 1-13 may vary by matter of design choice. For instance, pin 114/914 may attach to a space in recess 112/912 in a variety of ways, may comprise a solid material or hollow material along its central axis, or may comprise material that is rigid or flexible. In one embodiment, pin 114/914 is configured to slide (e.g., extend and withdraw) in an axial direction independent from axial movement of an exterior of socket tool 100 and/or fluid connector 400. For instance, pin 114/914 may be mounted to interior wall 116/916 which may slide to various positions along the axial direction to extend and withdrawn pin 114/914 in response to user configuration for wiping action of an aligned conduit 414 for improved maintenance of fluid connector 400.

Additionally, socket tool 100/900 may be configured to couple with maintenance devices to allow components and/or fluid to pass through a central axis of socket tool 100/900 through a hollow axis of any components included or used in conjunction with socket tool 100/900, including pin 114/914, interior wall 116/916, driver space 122/922, maintenance connector 1000, etc., to enable maintenance tool operation on conduit 414 and/or inner chamber of system component 510 via a central common axis. It will be appreciated that components or portions of components may be combined into common units and that the features and embodiments described herein may be combined in any number of combinations.

Additionally, features of socket tool 100/900 may be applied to a wide variety of fluid connectors, fluid systems, and industries including, but not limited to, pharmaceutical, oil and gas, aerospace, and other applications. For example, socket tool 100/900 may be used to install or remove fluid connectors in a production printer. Ink may be transferred from printhead nozzles to a manifold via flexible tubes that attach to the manifold with fluid connectors. Due to the confined space of a production printer and relatively small size of fluid connectors on the manifold, it may be difficult for a maintenance operator to see, reach, and grip fluid connectors for maintenance procedures within the production printer. Moreover, it may be particularly time consuming to physically remove the manifold from production printer for maintenance. Using socket tool 100/900, maintenance of the manifold is improved because socket tool 100/900 aligns and stabilizes fluid connector rotational movement and prevents any sealant that has been applied to fluid connector from forming and drying in the nozzle of fluid connectors. The alignment and rotational stability that socket tool 100/900 provides helps installation within confined space of the production printer without removal of the manifold so that downtime of production the printer for maintenance is reduced. The prevention of sealant blockage in fluid connector significantly reduces the chance that flow or leakage problems with the manifold occur in the future. Furthermore, the ability to adapt dimension of socket tool 100/900 and/or the ability to adapt configurations of pin 114/914 help stabilize fluid connector 400 for improved installation.

Although specific embodiments were described herein, the scope of the invention is not limited to those specific embodiments. The scope of the invention is defined by the following claims and any equivalents thereof.

We claim:

1. An apparatus comprising:
   a tool for servicing a fluid connector, wherein the fluid connector includes a nozzle, a non-circular fitting, and a threaded end, and wherein a conduit extends through the fluid connector to pass fluid through the fluid connector, the tool comprising:
   a body having a hollow recess at one end, wherein the hollow recess has non-circular dimensions to engage the non-circular fitting of the fluid connector for rotation of the fluid connector about an axis; and
   a pin mounted to a surface inside the hollow recess so that the pin is disposed in an axial direction along a center of the axis and the pin is fixed in the axial direction with respect to the body of the tool, wherein when the pin aligns with and enters the conduit of the fluid connector and the hollow recess is engaged with the non-circular fitting of the fluid connector, the pin occupies the conduit through the nozzle of the fluid connector to prevent fluid from passing through the conduit of the fluid connector.

2. The apparatus of claim 1 wherein:
the body having a driver opening at another end, the driver opening having a non-circular dimensions to engage a male driver for a rotation of the body about the axis.

3. The apparatus of claim 2 wherein:
the pin is fixed to an interior wall of the body, wherein the interior wall is disposed between the hollow recess and the driver opening.

4. The apparatus of claim 3 wherein:
the pin includes a hollow conduit that extends through a central axis of the pin.

5. The apparatus of claim 4 wherein:
the interior wall includes a hole that aligns with the hollow conduit of the pin in the axial direction.

6. The apparatus of claim 5 wherein:
the driver opening of the body is configured to couple with a maintenance component configured to circulate fluid in the conduit of the fluid connector via the hollow conduit in the pin.

7. The apparatus of claim 5 wherein:
the pin includes an inner pin configured to slide in the axial direction within the hollow conduit of the pin to cause the pin to expand in the conduit of the fluid connector when the hollow recess is engaged with the non-circular fitting of the fluid connector.

8. The apparatus of claim 1 further comprising:
a hollow spacer configured to fit inside the hollow recess, wherein an outer surface of the hollow spacer substantially corresponds with an inner surface of the hollow recess, and wherein a thickness of the hollow spacer enables the hollow recess to engage with a smaller head fitting of a fluid connector.

9. The apparatus of claim 1 further comprising:
a solid spacer with a hole that corresponds with dimensions of the pin, wherein the solid spacer is configured to slide over the pin via the hole and contact a surface of an interior wall of the hollow recess, and wherein the solid spacer is configured to stabilize the pin in the hollow recess when the hollow recess is engaged with the fluid connector.

10. The apparatus of claim 1 wherein:
the body has a hexagonal outer surface; and
the hollow recess has a hexagonal surface with dimensions smaller than the hexagonal outer surface.

11. The apparatus of claim 1 wherein:
the pin comprises a body that is solid throughout a central axis of the pin.

12. An apparatus comprising:
a socket configured to receive a corresponding head of a fitting for rotation about a central axis; the socket having a first recess configured to engage a corresponding non-circular head of a fitting and a second recess that is non-circular to engage a male driver and
a pin disposed within the socket along the central axis, the pin having a length in an axial direction from a first end fixed to a bottom of the socket to a second end disposed outside the socket, wherein the pin is fixed in the axial direction with respect to the socket;
wherein when the corresponding head of the fitting is seated within the socket, the second end of the pin extends through a length of a conduit inside the fitting aligned with the central axis to prevent a fluid from flowing through the conduit.

13. The apparatus of claim 12 wherein:
the pin includes a hollow conduit along the central axis of the pin; and
the hollow conduit includes an interior pin configured to extend and withdraw along the axial direction, wherein when the interior pin is extended through an opening of the pin in the axial direction it causes the pin to expand in a direction perpendicular to the axial direction.

14. An apparatus comprising:
a body having a first recess configured to engage a corresponding non-circular head of a fitting and a second recess that is non-circular to engage a male driver, the first recess and the second recess disposed at opposite ends of the body;
wherein the first recess includes a pin mounted to a bottom wall of the first recess such that the pin is fixed with respect to the body, the pin being centered within the first recess, and the pin having a length that extends beyond the first recess; and
wherein a diameter of the pin corresponds with a diameter of a conduit centered in the non-circular head of the fitting, the length of the pin being parallel with the conduit when the first recess and the corresponding non-circular head are engaged.

15. The apparatus of claim 14 wherein:
the pin is hollow along a length of the pin.

16. The apparatus of claim 15 wherein:
a hollow space of the pin is configured to transfer a fluid from a maintenance component to the conduit.

17. The apparatus of claim 14 wherein:
the pin is sized to contact walls of the conduit for rotational stability.

* * * * *